(12) United States Patent
Wiegand et al.

(10) Patent No.: US 10,982,794 B2
(45) Date of Patent: Apr. 20, 2021

(54) DETERMINING AND ACCOUNTING FOR WEAR ON A VALVE

(71) Applicant: Siemens Aktiengesellscaft, Munich (DE)

(72) Inventors: Armin Wiegand, Lichtenau-Muckenschopf (DE); Martin Wetzel, Rastatt (DE); Rainer Lochschmied, Rheinstetten-Forchheim (DE); Thomas Gnoss, Muggensturm (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 77 days.

(21) Appl. No.: 16/036,656

(22) Filed: Jul. 16, 2018

(65) Prior Publication Data

US 2019/0017627 A1 Jan. 17, 2019

(30) Foreign Application Priority Data

Jul. 17, 2017 (EP) .................................. 17181746

(51) Int. Cl.
*F16K 37/00* (2006.01)
*F16K 31/04* (2006.01)
*G05B 23/02* (2006.01)

(52) U.S. Cl.
CPC .......... *F16K 37/0083* (2013.01); *F16K 31/04* (2013.01); *F16K 37/0041* (2013.01);
(Continued)

(58) Field of Classification Search
CPC ............ F16K 37/0041; F16K 37/0083; Y10T 137/8242; Y10T 137/86397; G05B 2219/45006; G05B 23/0235
See application file for complete search history.

(56) References Cited

U.S. PATENT DOCUMENTS

| 5,579,992 A | * | 12/1996 | Masatoshi ............ G05D 23/025 236/12.21 |
| 6,267,138 B1 | * | 7/2001 | Hoffmann ............ G05B 19/406 137/551 |

(Continued)

FOREIGN PATENT DOCUMENTS

| CN | 1422369 A | 6/2003 | ............ F16K 37/00 |
| CN | 1525094 A | 9/2004 | ............ F16K 37/00 |

(Continued)

OTHER PUBLICATIONS

Russian Decision to Grant, Application No. 2018125790, 20 pages, dated Mar. 1, 2019.

*Primary Examiner* — Atif H Chaudry (74) *Attorney, Agent, or Firm* — Slayden Grubert Beard PLLC (57) ABSTRACT

An example control unit may include: a processor; an output device; a valve element; an actuator; and a sensor for the position of the valve element. The valve cycles and the processor records a first signal to measure a position of the valve element. The valve cycles and the processor records a second signal to measure a position of the valve element. The processor calculates a degree of wear based on the first value and the second value and the second number of valve cycles. The processor compares the degree of wear to a predefined threshold value and generates an output signal if the degree of wear exceeds the predefined threshold value.

14 Claims, 4 Drawing Sheets

(52) U.S. Cl.
CPC .............. *G05B 23/0235* (2013.01); *G05B 2219/45006* (2013.01); *Y10T 137/8242* (2015.04); *Y10T 137/86397* (2015.04)

(56) References Cited

U.S. PATENT DOCUMENTS

| | | | |
|---|---|---|---|
| 6,360,773 B1 | 3/2002 | Rhodes | 137/554 |
| 6,695,282 B2 | 2/2004 | Clemens et al. | 251/129.04 |
| 9,835,266 B2 | 12/2017 | Picht et al. | |
| 2006/0058932 A1* | 3/2006 | Garg | B60W 50/0205 701/32.8 |
| 2010/0179697 A1 | 7/2010 | Stelter et al. | 700/282 |
| 2012/0139725 A1 | 6/2012 | Grumstrup | 340/540 |
| 2013/0228005 A1 | 9/2013 | Suedel et al. | 73/37 |
| 2014/0166264 A1 | 6/2014 | Judge et al. | 166/66 |
| 2015/0149100 A1* | 5/2015 | Eisenbeis | G01B 7/003 702/58 |
| 2016/0223087 A1 | 8/2016 | Gillespie, III et al. | 137/565.01 |
| 2018/0216742 A1* | 8/2018 | Korten | G01L 7/082 |

FOREIGN PATENT DOCUMENTS

| | | | |
|---|---|---|---|
| DE | 102013001979 A1 | 8/2014 | ............ G05D 16/06 |
| EP | 2202496 A2 | 6/2010 | ............ G01F 11/02 |
| EP | 2297502 B1 | 2/2014 | ............ F15B 19/00 |
| RU | 2592146 C2 | 1/2015 | ............ F16K 37/00 |
| WO | 2010/056111 A1 | 5/2010 | ............ F16K 31/06 |

\* cited by examiner

DETERMINING AND ACCOUNTING FOR WEAR ON A VALVE

CROSS-REFERENCE TO RELATED APPLICATIONS

This application claims priority to EP Application No. 17181746.3 filed Jul. 17, 2017, the contents of which are hereby incorporated by reference in their entirety.

TECHNICAL FIELD

The present disclosure deals with valves for adjusting a flow of a gaseous and/or liquid fluid. In particular, the present disclosure deals with the recognition of wear on such a valve and various methods for accounting for such wear.

BACKGROUND

Valves for gaseous and/or liquid fluids have an inlet, an outlet, and a fluid path between inlet and outlet. Arranged in the fluid path is a valve element, which has a closed position. In its closed position the valve element prevents the flow of a fluid along the fluid path between inlet and outlet. Furthermore, the valve element has at least one open position. In its open position the valve element enables the flow of a fluid along the fluid path between inlet and outlet.

In the closed position of the valve element, a valve disc of the valve element rests on a valve seat of the valve element. In many cases, valve disc and valve seat are sealed from each other using a resilient element, such as, for example an O-ring made of (silicone and/or butadiene) rubber. The resilient element is advantageously mounted on the valve disc and/or valve seat. The resilient element is subject to ageing during operation.

Deterioration of the state of the resilient element that is not completely reversible occurs for example owing to a permanent deformation. In the case of a permanent deformation of this kind, the restoring forces of the aged element are no longer adequate to reverse a deformation caused by the closing of the valve element. That ageing may be accelerated by, for example, fluids flowing through the valve, which chemically attack the resilient element. That ageing may also be accelerated by fluids having temperatures above or below the temperature range permissible for the sealing element being used. Furthermore, excessive pressures can cause permanent damage to the resilient element.

Patent application WO2010/056111A1 discloses a solenoid valve with sensor for determining lift/speeds and/or accelerations of a moving core of the valve as an indication of failure mode and ageing state. WO2010/056111A1 was applied for on 12 Nov. 2009 and published on 20 May 2010. The arrangement from WO2010/056111A1 comprises a sensor 17 for determining the position of a valve element 8. At the same time, speeds and accelerations are determined. The determined values are compared with stored limit values. When a first threshold is exceeded, a signal is emitted as an indication of required maintenance.

Valves are often installed behind concrete walls and/or cellar ceilings. The arrangement from WO2010/056111A1 does not enable the emission of diagnosis data through concrete walls and/or cellar ceilings. The arrangement from WO2010/056111A1 is also not optimized in respect of a comparative evaluation of the ageing state over a large number of valve cycles.

SUMMARY

The teachings of the present disclosure may be embodied in methods and systems for the diagnosis of ageing of valves for gaseous and/or liquid fluids, in particular fuels. For example, some embodiments include a control unit for a valve arrangement, the control unit (16) comprising an output device, the valve arrangement comprising an adjustable valve element (1, 2, 3), wherein the adjustable valve element (1, 2, 3) has an open and a closed position. The valve arrangement also comprises: an actuator (14) and a sensor (15), wherein the actuator (14) and the sensor (15) are coupled directly or indirectly to the valve element (1, 2, 3), wherein the actuator (14) and the sensor (15) are communicatively connected to the control unit (16), and the control unit (16) is designed to control the actuator (14) such that it (14) performs a number of valve cycles, wherein a valve cycle comprises adjusting the valve element (1, 2, 3) into its open position and adjusting the valve element (1, 2, 3) into its closed position. The sensor (15) is designed to generate a signal corresponding to a position of the valve element (1, 2, 3). The control unit (16) is designed to control the actuator (14) such that it (14) performs a first number of valve cycles with at least one valve cycle, to read out a first signal from the sensor (15) following performance of the first number of valve cycles and to process it to form a first measured value of a position of the valve element (1, 2, 3), and to control the actuator (14) following reading out of the first signal such that it (14) performs a second number of valve cycles with at least one valve cycle, and to read out a second signal from the sensor (15) following performance of the second number of valve cycles and to process it to form a second measured value of a position of the valve element (1, 2, 3), and, based on the first and the second measured values and the second number of valve cycles, to determine a degree of wear and compare it with a predefined threshold value and to output a predefined output signal using the output device if the degree of wear exceeds the predefined threshold value.

In some embodiments, the control unit (16) is designed to calculate a measured value difference from the first and the second measured values and to determine a degree of wear based on the calculated measured value difference and the second number of valve cycles.

In some embodiments, the control unit (16) is designed to calculate a value of a difference from the first and the second measured values and to determine a degree of wear based on the calculated value and the second number of valve cycles.

In some embodiments, the control unit (16) is designed to calculate a load characteristic value as a function of the second number of valve cycles and to determine a degree of wear based on the first and the second measured values and the load characteristic value.

In some embodiments, the control unit (16) is designed to calculate a load characteristic value as a function of the second number of valve cycles and to determine a degree of wear based on the first and the second measured values and with reference to the load characteristic value.

In some embodiments, the control unit (16) is designed to calculate a measured value difference from the first and the second measured values and to calculate a load characteristic value as a function of the second number of valve cycles and to determine a degree of wear based on the measured value difference and the load characteristic value.

In some embodiments, the control unit (16) is designed to calculate a measured value difference from the first and the second measured values and to calculate a load characteristic value as a function of the second number of valve cycles and to determine a degree of wear by basing the measured value difference on the load characteristic value.

In some embodiments, the control unit (16) is designed to calculate a measured value difference from the first and the second measured values and a load characteristic value as a function of the second number of valve cycles and to determine a degree of wear by dividing the measured value difference by the load characteristic value.

In some embodiments, the control unit (16) is also designed, following reading out of the second signal, to control the actuator (14) such that it (14) performs a third number of valve cycles with at least one valve cycle, and to read out a third signal from the sensor (15) following performance of the third number of valve cycles and to process it to form a third measured value of a position of the valve element (1, 2, 3), and to form a model based on at least the first and the second measured values and based on at least the first and the second number of valve cycles, and to determine an expected value for the third measured value by applying the model to the third number of valve cycles, and to determine a deviation of the third measured value from the expected value for the third measured value, and to compare the determined deviation with a predefined maximum value for the determined deviation, and to output a predefined output signal using the output device if the determined deviation exceeds the predefined maximum value.

In some embodiments, the control unit (16) is also designed, following reading out of the second signal, to control the actuator (14) such that it (14) performs a third number of valve cycles with at least one valve cycle, and to form the model based on at least the first and the second measured values and the third measured value and based on at least the first number and the second number and the third number of valve cycles.

In some embodiments, the control unit (16) is designed for forming the model using linear regression.

In some embodiments, the control unit (16) as an output device comprises an illuminated display that can be activated by the control unit (16) and the control unit (16) is designed to output the predefined output signal using the output device by the control unit (16) activating the illuminated display.

In some embodiments, the control unit (16) as an output device comprises a communications interface for connection to a communications bus and the control unit (16) is designed to output the predefined output signal to the communications bus using the communications interface.

In some embodiments, the control unit (16) as an output device comprises a communications interface for connection to a communications bus and the control unit (16) is designed to output the predefined output signal to the communications bus with the aid of the communications interface using a predefined modulation method.

In some embodiments, the output device of the control unit (16) is communicatively connected to the actuator (14) and the predefined output signal is an interlock signal, on receipt of which by the actuator (14), locks the actuator (14), and the control unit (16) is designed to output the predefined output signal using the output device, by the control unit (16) outputting the interlock signal to the actuator (14).

BRIEF DESCRIPTION OF THE DRAWINGS

Various details of the teachings herein are described in the following detailed description. The individual embodiments are not limiting. The drawings, which are attached to the description, may be described as follows.

DETAILED DESCRIPTION

The teachings of the present disclosure may be embodied in a valve for adjusting flows of gaseous and/or liquid valves. In some embodiments, the valve comprises a valve seat as a fixed element and a valve disc as a moving element. A resilient element is mounted between valve seat and valve disc. In the closed state of the valve element, the resilient element seals the valve seat from the valve disc. A sensor, e.g., a lift sensor, detects the position of the valve disc. A cycle counter detects a number of valve openings and/or valve closings, moreover.

In some embodiments, the valve performs a first number of valve cycles, in other words, operations comprising valve opening and valve closing. A first state of the valve element is determined after a first number of valve cycles using the sensor. Thereafter, a second number of valve cycles is performed. Following performance of the second number of valve cycles, a second state of the valve element is determined. The first state is now compared with the second state. The difference between first and second states is optionally based on the second number of valve cycles. A result is formed as a (direct) function of the first state, of the second state and the number of cycles. The result can assume values, which point toward a perfect valve state and/or to a valve state requiring maintenance and/or to a defective valve state.

In some embodiments, the determination of the first state of the valve element comprises receiving a first signal from the sensor and/or processing the received first signal to form a first measured value and/or processing the first measured value to form a first state. The received first signal may be processed to form a first measured value using an analogue-to-digital converter. In some embodiments, the determination of the second state of the valve element comprises receiving a second signal from the sensor and/or processing the received second signal to form a second measured value and/or processing the second measured value to form a second state. The received second signal may be processed to form a second measured value using an analogue-to-digital converter.

In some embodiments, the first number of valve cycles comprises at least one, at least two, at least five or at least ten valve cycles. First determination of a valve state is therefore not performed in the new state. In some embodiments, the second number of valve cycles comprises at least one, at least two, at least five or at least ten valve cycles.

In some embodiments, the valve comprises a warning display. The formed result is output to a user using the warning display. The warning display is preferably a screen and/or a light-emitting diode.

In some embodiments, the valve comprises a communications interface. The formed result is sent using the communications interface. The communications interface may be designed for wireless and/or for wired communication.

In some embodiments, the communications interface includes a communications bus protocol and/or is compatible with a communications bus protocol. The formed result is sent with the aid of the communications interface using the communications bus protocol. Optionally, the formed result is sent in encrypted form with the aid of the communications interface using the communications bus protocol.

Figure 1:
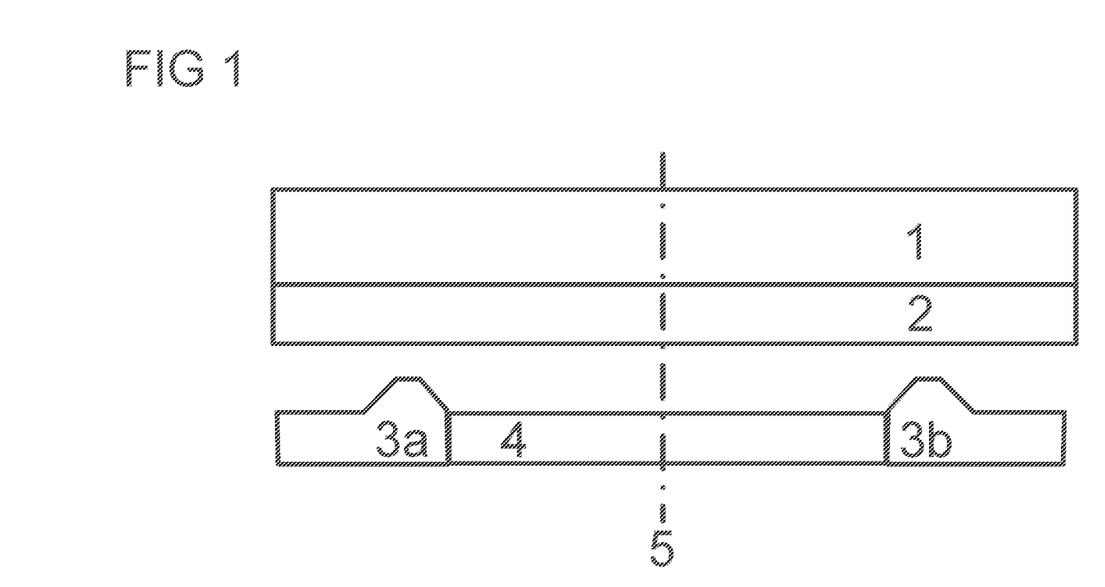
FIG. 1 schematically shows a valve element in the new or slightly aged state, according to teachings of the present disclosure.

FIG. 1 shows a valve element with a valve disc 1 and a valve seat 3a, 3b. A resilient element 2 is mounted on the valve disc 1. The resilient element 2 is arranged in such a way that it is located between valve disc 1 and valve seat 3a, 3b. FIG. 1 shows a valve element in the new and/or slightly aged state. A valve element of this kind is typically arranged between inlet and outlet of a valve in the fluid path of the valve. The valve element has a closed state, in which it prevents the flow of a fluid along the fluid path between inlet and outlet. In this state the resilient element 2 rests between valve disc 1 and valve seat 3a, 3b such that the flow of a fluid through the opening 4 is prevented.

The valve element also has an open state in which it enables a flow of a fluid along the fluid path between inlet and outlet. In this state the resilient element 2 is spaced apart from the valve seat 3a, 3b such that a flow of a fluid can pass through the opening 4. Ideally, there is a continuum of states between the open state and the closed state, in which the valve element is open for a particular percentage. The closed state of the valve element corresponds to an opening of 0 percent. The above-mentioned open state of the valve element corresponds to an opening of 100 percent. In some embodiments, the valve element can open and/or close in a finite number of discrete steps.

Gaseous and/or liquid fluids for example can be considered as fluids. In particular, combustible gaseous and/or combustible liquid fluids can be considered. Those gaseous and/or combustible fluids can exhibit a large number of temperatures and/or pressures.

In some embodiments, the resilient element 2 is fastened to the valve disc 1 as shown in the embodiment shown in FIG. 1. The person skilled in the art can for example rivet the resilient element 2 to the valve disc 1 and/or glue the resilient element 2 to the valve disc 1. The person skilled in the art can also fasten the resilient element 2 to the valve disc 1 using a dovetail groove. Said possibilities for fastening the resilient element 2 to the valve disc 1 are not exhaustive.

In some embodiments, the resilient element 2 may comprise a plastics material, for example by injection moulding and/or extrusion. Inter alia polymers, such as silicones and/or polymers based on butadiene and/or dipolymers or terpolymers based on hexafluoropropene and 1,1-difluoroethene and/or terpolymers based on tetrafluoroethylene and hexafluoropropene and 1,1-difluoroethene, can be considered as plastics materials.

In the example shown in FIG. 1, the resilient element 2 is fastened to the valve disc 1. The valve disc 1 and the resilient element 2 are therefore part of a moving element. In some embodiments, the resilient element 2 is fastened to the valve seat 3a, 3b. The valve disc 1 and the resilient element 2 are therefore part of a fixed element. The person skilled in the art also applies the teaching from the present disclosure to valve elements of this kind.

The person skilled in the art can for example rivet the resilient element 2 to the valve seat 3a, 3b and/or glue the resilient element 2 to the valve seat 3a, 3b and/or mount the resilient element 2 on the valve seat 3a, 3b by gumming. The person skilled in the art can also fasten the resilient element 2 to the valve seat 3a, 3b using a dovetail groove. Said possibilities for fastening the resilient element 2 to the valve seat 3a, 3b are not exhaustive.

In some embodiments, moving part 1, 2 of the valve element can move axially 5 with the aid of a tappet. A tappet is connected for this purpose to the valve disc 1. The tappet therefore moves together with the moving part 1, 2 of the valve element. In this way, the valve element can be moved by the tappet from its open position into its closed position. Similarly, the valve element can be moved by the tappet from its closed position into its open position. The valve element can also be moved by the tappet in a continuum of valve positions between the closed position and the open position (and vice versa). In some embodiments, the valve element can be moved by the tappet in discrete steps between the closed position and the open position (and vice versa).

In some embodiments, to move the valve element by way of the tappet, an actuator coupled to the tappet is provided. The actuator can be a hydraulic drive, in particular a magnetic piston pump. Furthermore, a(n) (electric, hydraulic and/or pneumatic) linear motor can be used as an actuator. Furthermore, a piezo drive is provided as an actuator.

In some embodiments, a sensor detects the position of the moving part 1, 2 of the valve element. In particular a lift sensor is provided as a sensor. Examples of sensors are also Hall sensors, microswitches and/or light barriers. A sensor of this kind can for example record the movement of the tappet, the actuator and/or the moving part 1, 2 of the valve element.

FIG. 1 also shows a valve element whose moving part 1, 2 can be axially displaced along a shaft 5. The person skilled in the art also considers valve elements rotatable about a shaft 5 in addition to axially 5 displaceable valve elements. The person skilled in the art also applies the teaching from the present disclosure to these kinds of valve elements.

The valve seat from FIG. 1 has a projection 3a, 3b. The projection 3a, 3b is directed toward the valve disc 1. The projection 3a, 3b may run along a circumferential line. In some embodiments, that circumferential line is closed. In some embodiments, the circumferential line has an annular cross-section. In particular, it is provided that the circumferential line runs along a circle, an ellipse and/or along a polygon.

Figure 2:
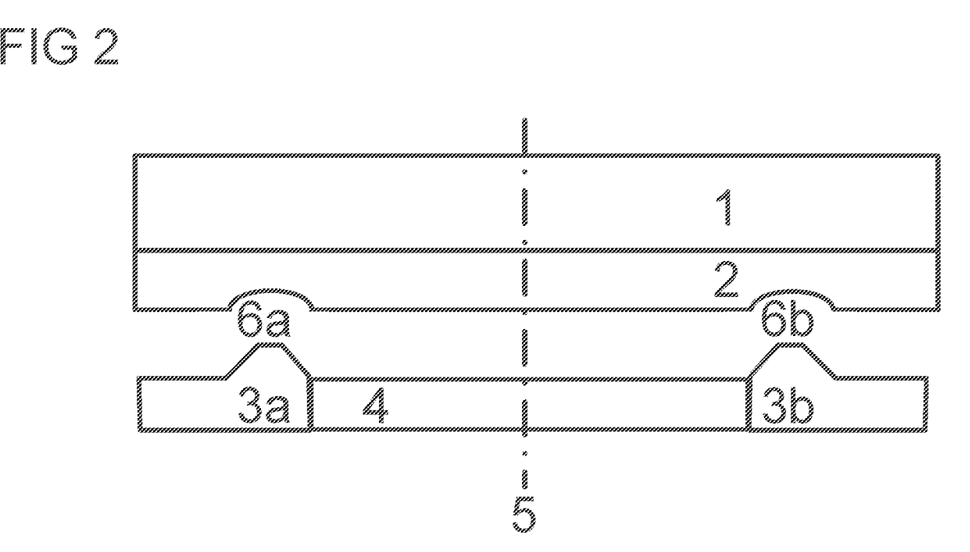
FIG. 2 schematically shows a valve element with a resilient element in the aged state, according to teachings of the present disclosure.

FIG. 2 shows a resilient element 2 in the aged state. The resilient element 2 has in this case an indentation 6a, 6b, which (largely) corresponds to the projection 3a, 3b of the valve seat. The indentation 6a, 6b is usually an indication of irreversible damage to the resilient element 2. At the locations with the indentation 6a, 6b the resilient element 2 has therefore (permanently) forfeited its elasticity. Furthermore, it is possible that the indentation 6a, 6b is produced by abrasion during opening and/or closing of the valve element.

The indentation 6a, 6b may run along a circumferential line and/or along a circumferential groove. In some embodiments, that circumferential line and/or circumferential groove is closed. In some embodiments, the circumferential line and/or groove has an annular cross-section. In some embodiments, the circumferential line and/or circumferential groove runs along a circle, an ellipse and/or along a polygon. The person skilled in the art recognises that the indentation 6a, 6b of the resilient element 2, in its shape and in its dimensions, (largely) corresponds to the projection 3a, 3b of the valve disc.

With increasing wear of the resilient element 2, the indentations 6a, 6b become larger. The enlargement of the indentations 6a, 6b also cause a change in the position of the moving part 1, 2 of the valve element in its closed position. With progressive wear, the moving part 1, 2 of the valve element has to be moved ever more in the direction of the valve disc 3a, 3b to (tightly) close the valve element. The person skilled in the art recognises that the tightness requirements depend on the circumstances of the respective application, such as, for example as a valve of a burner device.

The position of the moving part 1, 2 in the closed position of the valve element is therefore an indication and/or a symptom and/or a measure of ageing of the resilient element 2. It is therefore provided that the position of the moving part 1, 2 is recorded using the above-mentioned sensor directly or indirectly coupled to the moving part 1, 2.

Figure 3:
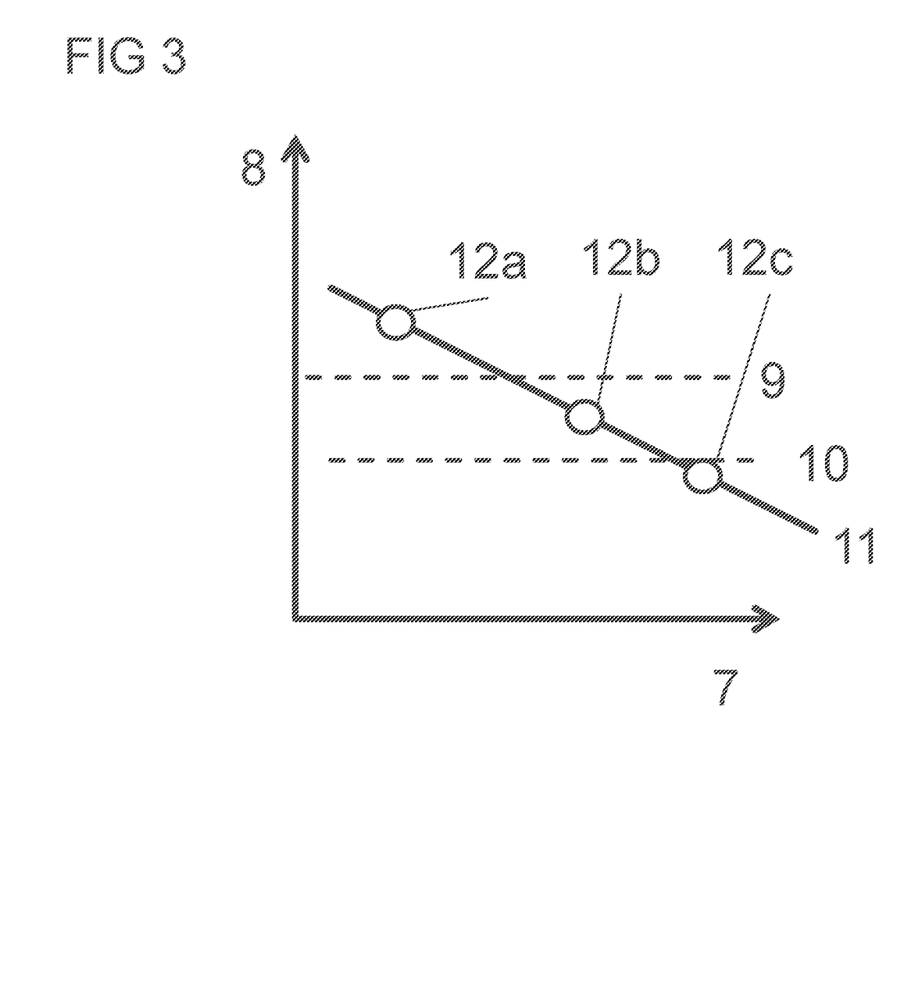
FIG. 3 shows as a graph the course of a valve lift as a function of valve cycles and/or operating periods, according to teachings of the present disclosure.

FIG. 3 reproduces a graph of the position 8 of the moving part 1, 2 in the closed position. The position 8 of the moving part 1, 2 is shown over the number of cycles 7 and/or over the operating period 7. Point 12a designates a position 8 of the moving part 1, 2 of the valve element in the new and/or slightly aged state.

With an increasing number of valve cycles 7 and/or with an increasing operating period 7, the wear increases in the form of ever larger indentations 6a, 6b. Accordingly, the moving part 1, 2 is displaced ever more in the direction of the valve seat 3a, 3b. This manifests itself in FIG. 3 in the form of increasingly lower values of position 8. Point 12b therefore stands for a valve element in the aged state with a mean number of valve cycles 7 and/or a mean operating period 7. The number of valve cycles 7 and/or the operating period 7 at point 12b exceeds the number of valve cycles 7 and/or the operating period 7 at point 12a. Corresponding to the advanced wear, the position 8 at point 12b is lower than that at point 12a.

Point 12c in FIG. 3 stands for a valve element in the clearly aged state with a high number of valve cycles 7 and/or a high operating period 7. The number of valve cycles 7 and/or the operating period 7 at point 12c exceeds the number of valve cycles 7 and/or the operating period 7 at point 12b as well as the number of valve cycles 7 and/or the operating period 7 at point 12a. Corresponding to the clearly advanced wear, the position 8 at point 12c is lower than that at point 12b and lower than that at point 12a.

In some embodiments, the points 12a and 12b from FIG. 3 are 10,000 cycles, 5,000 cycles, 2,000 cycles, 1,000 cycles and/or 1,000 operating hours, 500 operating hours, 200 operating hours, or 100 operating hours apart. In some embodiments, the points 12b and 12c from FIG. 3 are 10,000 cycles, 5,000 cycles, 2,000 cycles, 1,000 cycles and/or 1,000 operating hours, 500 operating hours, 200 operating hours, or 100 operating hours apart.

In FIG. 3 lower positions 8 stand for positions of the moving part 1, 2, which are closer to the valve seat 3a, 3b. In this case, the position 8 is for example a position, which increases from the valve disc 3a, 3b measured in the direction of the moving part 1, 2. The person skilled in the art recognises that the direction of the shaft 8 from FIG. 3 can also be chosen such that higher positions 8 stand for positions of the moving part 1, 2, which are closer to the valve seat 3a, 3b. In that case, the position 8 is for example a position, which decreases from the valve disc 3a, 3b measured in the direction of the moving part.

In some embodiments, the position 8 of the moving part 1, 2 changes during the course of ageing by a maximum of 2 millimetres, preferably by a maximum of 1 millimetre, particularly preferably by a maximum of 0.5 millimetres. The person skilled in the art chooses a sensor for recording the position of the moving part 1, 2 of the valve element with corresponding accuracy and/or resolution. In particular, it is provided that the sensor is queried in the sense of oversampling, for example a twofold, fourfold, eightfold and/or sixteen fold oversampling, in order to improve accuracy and/or resolution.

FIG. 3 also shows two threshold values 9 and 10 of position 8. The first threshold value 9 is a symptom and/or an indication and/or a measure of a valve element, in particular a resilient element 2, in the aged state. Point 12b corresponds to a position 8 in the aged state of the valve element, in particular in the aged state of the resilient element 2. In some embodiments, a position of the moving part 1, 2 beyond the threshold value 9 indicates that the valve element, in particular the resilient element 2, should be maintained. In some embodiments, a position of the moving part 1, 2 beyond the threshold value 9 indicates that the valve element, in particular the resilient element 2, should be replaced. In some embodiments, a position of the moving part 1, 2 beyond the threshold value 9 indicates that a further limited life of for example 1,000 cycles, 500 cycles, 200 cycles, 100 cycles and/or 100 operating hours, 50 operating hours, 20 operating hours, or 10 operating hours should be expected for the valve element, in particular for the resilient element 2.

The second threshold value 10 from FIG. 3 is a symptom and/or an indication and/or a measure of a valve element, in particular a resilient element 2, in the clearly aged state. Point 12c corresponds to a position 8 in the clearly aged state of the valve element, in particular in the clearly aged state of the resilient element 2. In some embodiments, a position of the moving part 1, 2 beyond the threshold value 10 indicates that the valve element, in particular the resilient element 2, should be replaced. In some embodiments, a position of the moving part 1, 2 beyond the threshold value 10 indicates that the valve element, in particular the resilient element 2, should be locked. In some embodiments, a position of the moving part 1, 2 beyond the threshold value 10 indicates that a further limited life of for example 10 cycles, 5 cycles, 2 cycles, 1 cycle and/or 1 operating hour, 0.5 operating hours, 0.2 operating hours, or 0.1 operating hours should be expected for the valve element, in particular for the resilient element 2.

In some embodiments, the positions 8 of the threshold values 9 and 10 are spaced apart by a maximum of 1 millimetre, preferably by a maximum of 0.5 millimetres, particularly preferably by a maximum of 0.2 millimetres. The threshold value 10 is typically a measure and/or an indication for indentations 6a, 6b, which are greater and/or more pronounced and/or deeper than the indentations 6a, 6b than the threshold value 9.

Figure 4:
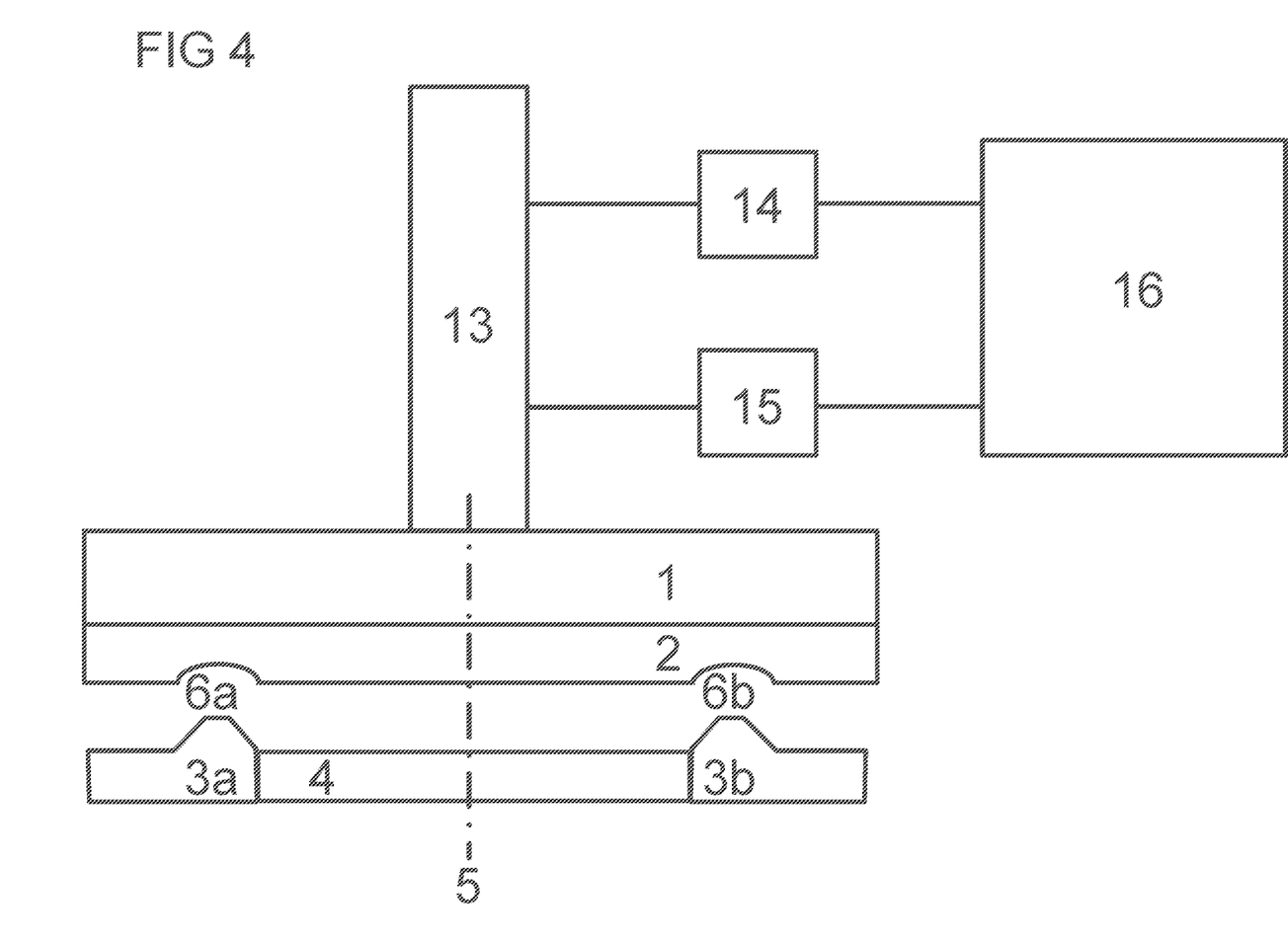
FIG. 4 schematically shows the coupling of the valve element to a valve control unit using an actuator and a sensor, according to teachings of the present disclosure.

In some embodiments, the valve element is coupled, as shown in FIG. 4, to a valve control unit 16. The valve control unit 16 may comprise a processing unit and a memory, in particular a non-volatile memory. The valve control unit 16 may comprise a microprocessor. In some embodiments, the valve control unit 16 comprises a microprocessor.

For coupling the valve control unit 16 to the valve element, FIG. 4 shows by way of example a tappet 13. The tappet 13 is connected, as stated before, to the valve disc 1. The tappet 13 can move, in particular axially, with the aid of an actuator 14. The valve control unit 16 communicates via a suitable interface, for example via a unidirectional or bidirectional interface, with the actuator 14. In some embodiments, the valve control unit 16 communicates via a communications bus protocol, such as, for example a digital and/or connectionless communications bus protocol, with the actuator 14. In some embodiments, the valve control unit 16 communicates via a serial field bus to ISO 11898-1:2003 with the actuator 14. In some embodiments, the valve control unit 16 communicates with the actuator 14 via network cables with integrated energy supply. In this way, the actuator 14 can be simultaneously controlled/regulated and supplied with energy by the valve control unit 16.

In some embodiments, a driver stage may be arranged between valve control unit 16 and actuator 14. The driver stage provides the power necessary for operation of the actuator 14. In some embodiments, a digital-to-analog converter may be arranged between valve control unit 16 and actuator 14. The digital-to-analog converter converts a digital signal from the valve control unit 16 into an analog signal, such as for example a current or a voltage, for operation of the actuator 14, in particular for operation of a winding of the actuator 14.

In some embodiments, individual components of the valve and/or of the valve element, including the tappet 13 and/or valve disc 1 and/or the resilient element 2 and/or valve seat 3a, 3b, can be made using an additive method. Said components can be made in particular using a three-dimensional printing method. In some embodiments, individual components are produced using an additive method, such as for example a three-dimensional printing method and other components using injection moulding.

The position of the tappet 13 (and therewith of the moving part 1, 2) is recorded according to FIG. 4 by a sensor 15. The valve control unit 16 communicates with the sensor 15 via a suitable interface, for example via a unidirectional or bidirectional interface. The valve control unit 16 preferably communicates with the sensor 15 via a communications bus protocol, such as, for example a digital and/or connectionless communications bus protocol. In one specific embodiment, the valve control unit 16 communicates with the sensor 15 via a serial field bus to ISO 11898-1:2003. In a further specific embodiment, the valve control unit 16 communicates with the sensor 15 via network cables with integrated energy supply. In this way, the sensor 15 can be simultaneously read and supplied with energy by the valve control unit 16.

In some embodiments, the sensor 15 returns an (analog) signal in the form of millivolts or volts or milliamperes or amperes to the valve control unit 16. The valve control unit 16 has for this purpose an analog-to-digital converter. The analog-to-digital converter of the valve control unit 16 may be an integral component of the microprocessor contained therein. The analog-to-digital converter of the valve control unit 16 therefore converts the (analog) signal of the sensor 15 into a digital value. That digital value can then be processed further by the valve control unit 16 and/or by its microprocessor. The person skilled in the art continues to consider suitable (noise) filters for processing the signal originating from the sensor 15. That filter can be arranged (in the signal path) upstream as well as downstream of the analog-to-digital converter.

In some embodiments, the valve control unit 16 opens and closes the valve element using the actuator 14. For opening, the valve control unit 16 sends an opening signal and/or command. The actuator 14 receives the signal and/or the command. The actuator 14 subsequently opens the valve element by moving the moving part 1, 2 (using the tappet 13). In some embodiments, the actuator 14, following opening of the valve element, returns a signal to the valve control unit 16. The valve control unit 16 receives the returned signal. Using the returned signal, the valve control unit 16 then recognises that the valve element is open.

For closing, the valve control unit 16 sends a closing signal and/or command. The actuator 14 receives the signal. The actuator 14 subsequently closes the valve element by moving the moving part 1, 2 (using the tappet 13). In some embodiments, the actuator 14, following closing of the valve element, returns a signal to the valve control unit 16. The valve control unit 16 receives the returned signal. Using the returned signal, the valve control unit 16 then recognises that the valve element is closed. In some embodiments, the actuator 14 confirms, moreover, receipt of the signals and/or commands for opening and/or closing to the valve control unit 16.

In addition to or instead of a response by the actuator 14, a response using the sensor 15 is also provided. In this case, the valve control unit 16, sometime after an opening command, queries the position of the moving part 1, 2 of the valve element using the sensor 15 (coupled to the tappet 13). The sensor 15 returns a signal in response to the query by the valve control unit 16, which signal is an indication and/or measure of the position of the moving part 1, 2 of the valve element. Within the meaning of oversampling, a plurality of queries can be made of the sensor 15 and/or a plurality of responses by the sensor 15 in order to improve accuracy and/or resolution. Furthermore, a plurality of queries can be made of the sensor 15 for reasons of redundancy.

In some embodiments, the valve control unit queries the sensor 15 within 1 second, within 0.5 seconds or within 0.1 seconds of the signal and/or command for opening to the actuator 14. According to a related variant of the disclosure, the valve control unit queries the sensor 15 within 1 second, within 0.5 seconds or within 0.1 seconds of the signal and/or command for closing to the actuator 14. According to a further variant of the disclosure, the valve control unit queries the sensor 15 within 1 second, within 0.5 seconds or within 0.1 seconds following the response by the actuator 14.

In some embodiments, the sensor 15, independently of querying by the valve control unit 16, communicates of its own accord a signal, which is an indication and/or measure of the position of the moving part 1, 2 of the valve element, to the valve control unit 16. In some embodiments, the sensor 15 registers a change in the position of the valve element. As a consequence of registration of the change and without querying by the valve control unit 16, the sensor 15 sends a signal to the valve control unit 16. That signal is an indication and/or measure of the position of the moving part 1, 2 of the valve element.

In some embodiments, the sensor 15 is integrated in the actuator 14. In particular, it is provided that the valve control unit 16 communicates via the same communicative connection, for example via the same (serial) field bus, with the sensor 15 and the actuator 14. In an exemplary application, the valve control unit 16 communicates with the sensor 15 and/or the actuator 14 via fibre optics.

Determination of wear of the valve element, in particular of the resilient element 2, is possible during operation with the arrangement described herein. A valve element is assumed here, which has already performed a first number of valve cycles comprising opening and closing and/or has undergone a first number of operating hours. For example, the valve element has performed at least 100, at least 1,000 or at least 10,000 valve cycles comprising opening and closing. In some embodiments, the valve element has already worked for at least 10, at least 100 or at least 1,000 operating hours.

At least one signal is then sent by the sensor 15 to the valve aged in this way. The valve control unit 16 receives that at least one signal. The valve control unit 16 processes that at least one signal to form a first measured value of the position of the moving part 1, 2 of the valve element. Typically, processing of that at least one first signal comprises a conversion using an analogue-to-digital converter and/or a filter. The valve control unit 16 then stores the determined measured value in its memory, preferably in its non-volatile memory.

As a consequence, the valve control unit 16 performs a number of valve cycles, for example 1 valve cycle, 2 valve cycles, 5 valve cycles or 10 valve cycles. The valve cycles each comprise opening and closing of the valve element. The sequence of opening and closing is (usually) irrelevant. This means, the valve element can firstly be opened and then closed or firstly be closed and then opened. As a consequence, the valve control unit 16 can also work for a number of operating hours, for example 1 operating hour, 2 operating hours, 5 operating hours or 10 operating hours.

Performance of the valve cycles and/or completion of the operating hours can occur during normal operation. In this case, valve cycles are performed according to the requirements of the respective application, for example an application in burner equipment and/or a pneumatic controller. Performance of the valve cycles and/or completion of the operating hours can also occur in the maintenance mode in which the valve and/or the valve element is not available for the respective application.

At least one further signal is then sent by the sensor 15 to the additionally aged valve. The valve control unit 16 receives that at least one further signal. The valve control unit 16 processes that at least one further signal to form a second measured value of the position of the moving part 1, 2 of the valve element. Typically, processing that at least one further signal comprises a conversion using an analogue-to-digital converter and/or a filter. The valve control unit 16 preferably then stores the determined second measured value in its memory, in particular in its non-volatile memory.

In some embodiments, the valve control unit 16, in particular its processing unit, then reads the first measured value from the (non-volatile) memory. If necessary, the valve control unit 16, in particular its processing unit, also reads the second measured value from the (non-volatile) memory. The valve control unit 16, in particular its processing unit, then determines as a (direct) function of the first and the second measured values and an ageing indicator, the progress of ageing of the valve element, in particular of the resilient element 2. The ageing indicator is typically the number of valve cycles performed or number of operating hours completed between determination of the first and second measured values. The ageing indicator can also be a (direct) function of the number of valve cycles performed and the number of operating hours completed between determination of the first and the second measured values. For example, the ageing indicator can be a (weighted) sum of performed valve cycles and completed operating hours.

In some embodiments, the (processing unit) of the valve control unit 16 determines the difference between the first measured value and the second measured value. In some embodiments, the valve control unit 16 determines the absolute value of the difference between the first measured value and the second measured value. That difference and/or its absolute value is then based on the ageing indicator. That difference and/or its absolute value is advantageously divided by the ageing indicator. The result of the calculation is a measure of the progress of ageing.

In some embodiments, at least one predefined threshold value for the progress of ageing is stored in the (non-volatile) memory of the valve control unit 16. The (processing unit of the) valve control unit 16 reads the at least one predefined threshold value from the (non-volatile) memory. The processing unit then compares the determined progress of ageing with the at least one predefined threshold value. If the determined progress of ageing indicates ageing, which is above the at least one predefined threshold value, an output is made by the valve control unit 16.

In some embodiments, at least one further predefined threshold value for the progress of ageing can also be stored in the (non-volatile) memory of the valve control unit 16. The at least one further predefined threshold value corresponds to ageing that has progressed with respect to the at least one predefined threshold value. The (processing unit of the) valve control unit 16 reads the at least one further threshold value from the (non-volatile) memory. The processing unit then compares the determined progress of ageing with the at least one further threshold value. If the determined progress of ageing indicates ageing, which is above the at least one further threshold value, a further output is made by the valve control unit 16.

In some embodiments, the disclosed sequence of ageing, status detection, renewed ageing, renewed status detection, etc. can be extended and/or repeated as desired. In some embodiments, ageing comprising a plurality of valve cycles and/or a plurality of operating hours again follows detection of the second measured value. The state of the valve element is then detected using a third measured value and a further ageing indicator relating to the third measured value is determined. In general, after some time a number of value pairs comprising a measured value of the position of the moving part 1, 2 of the valve element and an associated ageing indicator are obtained. The valve control unit is designed to store the value pairs in its (non-volatile) memory.

In some embodiments, the (processing unit) of the valve control unit 16 then loads the value pairs comprising measured value and ageing indicator, if required, from the (non-volatile) memory. The valve control unit 16 then calculates a regression line (preferably solely) based on the number of value pairs. The calculation may be made using linear regression.

After a few valve cycles and/or operating hours, the valve control unit 16 then records a measured value of the position of the valve element again. The (processing unit) of the valve control unit 16 simultaneously calculates a new ageing indicator from the few valve cycles and/or operating hours. The new ageing indicator is then used together with the calculated regression lines to calculate and/or predict a measured value for the new ageing indicator. The measured value calculated and/or predicted on the basis of the new ageing indicator is then compared with the (measured, actual) new measured value. In particular, the difference and/or the absolute value of the difference of the two values is determined. If the predicted measured value differs from the (measured, actual) new measured value by more than a predefined third threshold value, an output is made by the valve control unit 16. The predefined third threshold value may be stored in the (non-volatile) memory of the valve control unit 16. The processing unit of the valve control unit 16 loads the predefined third threshold value from the (non-volatile) memory for comparison purposes in this case.

In some embodiments, the newly measured measurement and its ageing indicator are incorporated in the regression line. This means that a modified regression line is calculated on the basis of the newly measured measurement and its ageing indicator and on the basis of all preceding value pairs comprising measured value and ageing indicator. The modified regression line is then used together with the ageing indicator of the newly measured measurement to calculate and/or predict a modified measured value. The modified measured value calculated and/or predicted on the basis of the new ageing indicator is then compared with the (measured, actual) new measured value. In particular, the difference and/or the absolute value of the difference between the two values is determined. If the calculated and/or predicted measured value differs from the (measured, actual) new measured value by more than a predefined fourth threshold value, an output is made by the valve control unit 16. The predefined fourth threshold value is preferably stored in the (non-volatile) memory of the valve control unit 16. The processing unit of the valve control unit 16 loads the predefined fourth threshold value from the (non-volatile) memory for comparison purposes in this case.

In some embodiments, the valve control unit 16 has a display in the form of a light-emitting diode and can control this diode. In the case of an output or a further output, the valve control unit 16 controls the light-emitting diode such that it illuminates. In some embodiments, different diodes, in particular diodes with different colours, are provided for the output and for the further output.

In some embodiments, the valve control unit 16 has a graphics module and a display in the form of a screen. In the case of an output or a further output, the valve control unit 16 generates a signal for displaying a warning message. The valve control unit 16 passes the signal to its graphics module in order to display a warning message. The graphics module outputs the warning on the screen. In some embodiments, different warning messages are provided for the output and for the further output.

Said screen can be in particular a black and white screen, greyscale screen or colour screen with a suitable resolution. Suitable resolutions are inter alia 426×320 pixels, 470×320 pixels, 640×480 pixels, 960×720 pixels. This list is not exhaustive. The screen can be designed for example as a liquid crystal screen or as a tube screen or as electronic paper or using organic light-emitting diodes. The screen is preferably mounted on the outside of the housing of the valve and/or valve control unit 16. The list of embodiments and resolutions of screens is not exhaustive.

In some embodiments, the valve control unit 16 has a communications interface for connection to a communications bus. In the case of an output or a further output, the valve control unit 16 generates a signal for transmitting a warning message. The valve control unit 16 passes the signal to its communications interface in order to transmit a warning message. The communications interface transmits the warning message via the communications bus. In some embodiments, different warning messages are provided for the output and for the further output. The warning message may be transmitted via the communications bus using a digital and/or connectionless communications bus protocol.

For communication via the communications bus, a suitable (digital and/or connectionless) communications bus protocol and/or a suitable (bidirectional) communications bus is used. In particular, a communications bus protocol and/or a communications bus may be used for wireless transmission of information. In the case of a wireless transmission of information, it should be noted that valves and/or valve elements and/or valve control units 16 are often installed in the cellar and/or behind reinforced concrete ceilings. Accordingly, robust methods of wireless data transmission are used.

In some embodiments, the communications interface of the valve control unit 16 therefore transmits wirelessly using a specific modulation method, such as phase shift keying or quadrature phase shift keying. Furthermore, the reliability of wireless data transmission can be improved by increasing the redundancy of the data to be transmitted. Therefore, for example a message to be transmitted via the bus can be composed of up to 2,000 individual transmissions. The robustness and/or the range of the wireless data transmission can be optimised by said improvements. Further improvements in this regard relate to the choice of a suitable channel width (of 180 kHz) in connection with a suitable frequency band (preferably around 800 MHz, for example 868 MHz).

In some embodiments, a communications bus protocol with encryption is used for communication. In some embodiments, a communications bus protocol is used for encryption, based on an (elliptical) Diffie-Hellman algorithm.

In some embodiments, the actuator 14 is designed to receive a signal for locking the valve element and when such a signal is received, to lock the valve element and/or itself. In the locked state, the valve element and/or the actuator 14 is blocked. The valve element can therefore no longer open or close until a possible unlocking. In the case of an output or a further output, the valve control unit 16 generates a signal for locking the valve element. The valve control unit 16 outputs the signal for locking the valve element to the actuator 14. The actuator 14 locks the valve element and/or itself when such a signal is received.

Parts of a regulator or a method according to the present disclosure can be executed as hardware, as a software module, which is implemented by an arithmetic unit, or using a cloud computer, or using a combination of said possibilities. The software can comprise firmware, a hardware driver, which is implemented inside the operating system, or an application program. The present disclosure therefore also refers to a computer program product, which contains the features of this disclosure or performs the necessary steps. In the case of implementation as software, the described functions can be stored as one or more command(s) on a computer-readable medium. Some examples of computer-readable media include random access memory (RAM), magnetic random access memory (MRAM), read only memory (ROM), flash memory, electronically programmable ROM (EPROM), electronically programmable and erasable ROM (EEPROM), registers of an arithmetic unit, a hard disc, a replaceable memory unit, an optical memory, or any suitable medium which can be accessed by a computer or by other IT devices and applications.

In some embodiments, a control unit for a valve arrangement, the control unit (16) comprises an output device, the valve arrangement comprising an adjustable valve element (1, 2, 3), wherein the adjustable valve element (1, 2, 3) has an open and a closed position, the valve arrangement also comprising an actuator (14) and a sensor (15), wherein the actuator (14) and the sensor (15) are coupled directly or indirectly to the valve element (1, 2, 3), wherein the actuator (14) and the sensor (15) are communicatively connected to the control unit (16), and the control unit (16) is designed to control the actuator (14) such that it (14) performs a number of valve cycles, wherein a valve cycle comprises an adjustment of the valve element (1, 2, 3) into its open position and an adjustment of the valve element (1, 2, 3) into its closed position, wherein the sensor (15) is designed to generate a signal corresponding to a position of the valve element (1, 2, 3), wherein the control unit (16) is designed to control the actuator (14) such that it (14) performs a first number of valve cycles with at least one valve cycle, to read out a first signal from the sensor (15) following performance of the first number of valve cycles and to process it to form a first measured value of a position of the valve element (1, 2, 3), and to control the actuator (14) following reading out of the first signal such that it (14) performs a second number of valve cycles with at least one valve cycle, and to read out a second signal from the sensor (15) following performance of the second number of valve cycles and to process it to form a second measured value of a position of the valve element (1, 2, 3), and based, in particular exclusively based, on the first and the second measured values and the second number of valve cycles, to determine a degree of wear and compare it with a predefined threshold value and to output a predefined output signal using the output device if the degree of wear exceeds the predefined threshold value.

In some embodiments, a valve arrangement with a control unit (16), the control unit (16) comprising an output device, the valve arrangement comprises an adjustable valve element (1, 2, 3), wherein the adjustable valve element (1, 2, 3) has an open and a closed position, the valve arrangement also comprising an actuator (14) and a sensor (15), wherein the actuator (14) and the sensor (15) are directly or indirectly coupled to the valve element (1, 2, 3), wherein the actuator (14) and the sensor (15) are communicatively connected to the control unit (16), and the control unit (16) is designed to control the actuator (14) such that it (14) performs a number of valve cycles, wherein a valve cycle comprises an adjustment of the valve element (1, 2, 3) into its open position and an adjustment of the valve element (1, 2, 3) into its closed position, wherein the sensor (15) is designed to generate a signal corresponding to a position of the valve element (1, 2, 3), wherein the control unit (16) is designed to control the actuator (14) such that it (14) performs a first number of valve cycles with at least one valve cycle, to read out a first signal from the sensor (15) following performance of the first number of valve cycles and to process it to form a first measured value of a position of the valve element (1, 2, 3), and to control the actuator (14) following reading out of the first signal such that it (14) performs a second number of valve cycles with at least one valve cycle, and to read out a second signal from the sensor (15) following performance of the second number of valve cycles and to process it to form a second measured value of a position of the valve element (1, 2, 3), and based, in particular exclusively based, on the first and the second measured values and the second number of valve cycles, to determine a degree of wear and compare it with a predefined threshold value and to output a predefined output signal using the output device if the degree of wear exceeds the predefined threshold value.

In some embodiments, the first number of valve cycles comprises at least one, at least two, at least five or at least ten valve cycle(s). In some embodiments, the second number of valve cycles comprises at least one, at least two, at least five or at least ten valve cycle(s). In some embodiments, the third number of valve cycles comprises at least one, at least two, at least five or at least ten valve cycle(s).

In some embodiments, the control unit (16) and/or valve arrangement comprises a (non-volatile) memory. The predefined threshold value may be stored in the (non-volatile) memory of the control unit (16). The control unit (16) may read the predefined threshold value from the memory of the control unit (16) and compare it with the determined degree of wear.

In some embodiments, the control unit (16) and/or valve arrangement comprises a (non-volatile) memory. The predefined output signal may be stored in the (non-volatile) memory of the control unit (16). The control unit (16) may read the predefined output signal from the memory of the control unit (16) and output it using the output device.

In some embodiments, the control unit (16) and/or valve arrangement comprises a (non-volatile) memory. The predefined maximum value may be stored in the (non-volatile) memory of the control unit (16). The control unit (16) may read the predefined maximum value from the memory of the control unit (16) and compare it with the determined deviation.

In some embodiments, the first signal is processed to form a first measured value using an analogue-to-digital converter and/or using a filter. In some embodiments, the second signal is processed to form a second measured value using an analogue-to-digital converter and/or using a filter. In some embodiments, the third signal is processed to form a third measured value using an analogue-to-digital converter and/or using a filter. In some embodiments, the control unit comprises a microprocessor. In some embodiments, the analogue-to-digital converter and/or the filter is integrated in the microprocessor. In some embodiments, the actuator (14) is communicatively connected by a digital-to-analogue converter to the control unit (16). In some embodiments, the digital-to-analogue converter is integrated in the microprocessor of the control unit (16).

A first signal and/or a second signal may be read from the sensor (15) with oversampling, for example with twofold, fourfold, eightfold or sixteen-fold oversampling.

In some embodiments, a control unit (16) is designed to calculate a measured value difference from the first and the second measured values and, based, in particular exclusively based, on the calculated measured value difference and the second number of valve cycles, to determine a degree of wear. In some embodiments, a control unit (16) is designed to calculate a value of a difference from the first and the second measured values and, based, in particular exclusively based, on the calculated value and the second number of valve cycles, to determine a degree of wear.

In some embodiments, control units (16) are designed to calculate a load characteristic value as a (direct) function of the second number of valve cycles and, based, in particular exclusively based, on the first and the second measured values and the load characteristic value, to determine a degree of wear.

In some embodiments, control unit (16) calculates a load characteristic value as a (direct) function of the second number of valve cycles and, based, in particular exclusively based, on the first and the second measured values and by reference to, or by division by, the load characteristic value, to determine a degree of wear.

In some embodiments, control unit (16) is designed to calculate a measured value difference from the first and the second measured values and a load characteristic value as a (direct) function of the second number of valve cycles and, based, in particular exclusively based, on the measured value difference and the load characteristic value, to determine a degree of wear.

In some embodiments, the control unit (16) is designed to calculate a measured value difference from the first and the second measured values and load characteristic value as a (direct) function of the second number of valve cycles and to determine a degree of wear by basing the measured value difference on the load characteristic value.

In some embodiments, the control unit (16) and/or valve arrangement is designed to determine and/or to calculate a degree of wear by dividing the measured value difference by the load characteristic value.

In some embodiments, the control unit (16) is designed to calculate a measured value difference from the first and the second measured values and a load characteristic value as a (direct) function of the second number of valve cycles and to determine a degree of wear by dividing the measured value difference by the load characteristic value. In some embodiments, the control unit (16) and/or valve arrangement and is designed to determine and/or calculate a degree of wear by dividing the value of the measured value difference by the value of the load characteristic value.

The present disclosure also teaches one of said control units and/or valve arrangements, wherein the control unit (16) is also designed, following reading out of the second signal, to control the actuator (14) such that it (14) performs a third number of valve cycles with at least one valve cycle, and following performance of the third number of valve cycles, to read a third signal from the sensor (15) and to process it to form a third measured value of a position of the valve element (1, 2, 3), and based, in particular exclusively based, on at least the first and the second measured value and, based, in particular exclusively based, on at least the first and the second number of valve cycles, to form a model, and by application of the model to the third number of valve cycles, to determine an expected value for the third measured value, and to determine a deviation of the third measured value from the expected value for the third measured value, and to compare the determined deviation with a predefined maximum value for the determined deviation, and to output a predefined output signal using the output device if the determined deviation exceeds the predefined maximum value.

In some embodiments, the control unit (16) is also designed, following reading out of the second signal, to control the actuator (14) such that it (14) performs a third number of valve cycles with at least one valve cycle, and, based, in particular exclusively based, on at least the first and the second measured values and the third measured value and, based, in particular exclusively based, on at least the first number and the second number and the third number of valve cycles, to form the model.

In some embodiments, the control unit (16) is designed to form the model using linear regression. Instead of linear regression, the control unit (16) can for example be designed to form the model using (any) regression, in particular by adjusting to a polynomial of the second order.

In some embodiments, the control unit (16) as an output device comprises an illuminated display that can be activated by the control unit (16) and the control unit (16) is designed to output the predefined output signal using the output device by the control unit (16) activating the illuminated display.

In some embodiments, the control unit (16) as an output device comprises a communications interface for connection to a communications bus and the control unit (16) is designed to output the predefined output signal to the communications bus using the communications interface.

In some embodiments, the control unit (16) as an output device comprises a communications interface for connection to a communications bus and the control unit (16) is designed to output the predefined output signal to the communications bus with the aid of the communications interface using a predefined modulation method. For example, phase shift keying and/or quadrature phase shift keying can be considered as the modulation method.

In some embodiments, the output device of the control unit (16) is communicatively connected to the actuator (14) and the predefined output signal is a locking signal, on receipt of which by the actuator (14), locks the actuator (14), and the control unit (16) is designed to output the predefined output signal to the actuator (14) with the aid of the output device by the control unit (16) outputting the locking signal. On receipt of the locking signal by the actuator (14), the actuator (14) may lock in such a way that it can only be unlocked by a manual intervention.

A load characteristic value may include a degree of load. The load is a stress, which acts on an arrangement. The load is a (direct) cause of ageing. The degree of wear may be called an ageing characteristic value.

A direct function is a function, which depends exclusively on the given arguments. Meanwhile, a direct function can also depend on constants, which are incorporated into the calculation of the function. Such constants are parameters and not arguments. A variable, which is based exclusively on a further variable, does not depend on any other variables or arguments. Constants can be incorporated into the calculation in the meantime. Such constant are parameters and not arguments.

That stated above refers to individual embodiments of the disclosure. Various changes to the embodiments can be made without deviating from the underlying idea and without departing from the scope of this disclosure. The subject matter of the present disclosure is defined by its claims. A wide variety of changes can be made without departing from the scope of the following claims.

LIST OF REFERENCE NUMERALS 1 valve disc
2 resilient element
3, 3a, 3b valve seat
4 valve opening
5 shaft
6, 6a, 6b indentations (as a consequence of wear)
7 load characteristic value
8 degree of wear
9 predefined threshold value
10 predefined threshold value
11 regression line
12, 12a, 12b, 12c points relating to different levels of wear
13 tappet
14 actuator
15 sensor
16 control unit

The invention claimed is:

1. A control unit for a valve arrangement, the control unit comprising:
   a processor communicatively connected to a memory storing a set of instructions;
   an output device;
   a valve element with an open position and a closed position;
   an actuator; and
   a sensor generating a signal corresponding to a current position of the valve element;
   wherein the actuator and the sensor are communicatively connected to the processor;
   wherein the processor is configured to access the memory and execute the set of instructions, the set of instructions causing the processor to:
   control the actuator to perform a first number of valve cycles, wherein a valve cycle includes both actuating the valve element into the open position and actuating the valve element into the closed position;
   record a first signal from the sensor following performance of the first number of valve cycles and forms a first measured value of a position of the valve element;
   control the actuator to perform a second number of valve cycles;
   record a second signal from the sensor following performance of the second number of valve cycles and forms a second measured value of a position of the valve element;
   calculate a load characteristic value indicating a degree of load;
   calculate a degree of wear based on the first measured value and the second measured value and the load characteristic value;
   compare the degree of wear to a predefined threshold value; and
   generate a predefined output signal using the output device if the degree of wear exceeds the predefined threshold value;
   following recording the second signal, control the actuator to perform a third number of valve cycles;
   record a third signal from the sensor following performance of the third number of valve cycles;
   process the third signal to form a third measured value of a position of the valve element;
   form a model based on at least the first and the second measured values and based on at least the first and the second number of valve cycles;
   determine an expected value for the third measured value by applying the model to the third number of valve cycles;
   determine a deviation of the third measured value from the expected value for the third measured value;
   compare the determined deviation with a predefined maximum value for the determined deviation; and
   generate a predefined output signal using the output device if the determined deviation exceeds the predefined maximum value.

2. A control unit according to claim 1, wherein the set of instructions further causes the processor to:
   calculate a measured value difference from the first and the second measured values; and
   determine a degree of wear based on the calculated measured value difference and the second number of valve cycles.

3. A control unit according to claim 1, wherein the set of instructions further causes the processor to:
   calculate a value of a difference from the first and the second measured values; and
   determine a degree of wear based on the calculated value and the second number of valve cycles.

4. A control unit according to claim 1, wherein the set of instructions further causes the processor to:
   calculate a measured value difference from the first and the second measured values; and
   determine a degree of wear based on the measured value difference and the load characteristic value.

5. A control unit according to claim 1, wherein the set of instructions further causes the processor to:
   calculate a measured value difference from the first and the second measured values; and
   determine a degree of wear by basing the measured value difference on the load characteristic value.

6. A control unit according to claim 1, wherein the set of instructions further causes the processor to:
   calculate a measured value difference from the first and the second measured values; and
   determine a degree of wear by dividing the measured value difference by the load characteristic value.

7. A control unit according to claim 1, wherein the set of instructions further causes the processor to:
   form a model based on at least the first and the second measured values and the third measured value and the first number and the second number and the third number of valve cycles.

8. A control unit according to claim 1, wherein the set of instructions further causes the processor to form the model using linear regression.

9. A control unit according to claim 1, wherein the output device comprises an illuminated display activated by the processor to output the predefined output signal.

10. A control unit according to claim 1, wherein:
    the output device comprises a communications interface for connection to a communications bus; and
    the processor sends the predefined output signal to the communications bus using the communications interface.

11. A control unit according to claim 1, wherein:
    the output device comprises a communications interface for connection to a communications bus; and
    the processor sends the predefined output signal to the communications bus via the communications interface using a predefined modulation method.

12. A control unit according to claim 1, wherein:
    the output device is communicatively connected to the actuator; and
    the predefined output signal is an interlock signal, on receipt of which the actuator locks the actuator; and
    the control unit processor sends the predefined output signal using the output device including sending the interlock signal to the actuator.

13. A control unit for a valve arrangement, the control unit comprising:
    an actuator;
    an output device in operative communication with the actuator;
    a processor communicatively connected to a memory storing a set of instructions;
    a valve element with an open position and a closed position; and
    a sensor generating a signal corresponding to a current position of the valve element;
    wherein the actuator and the sensor are communicatively connected to the processor;

wherein the processor is configured to access the memory and execute the set of instructions, the set of instructions causing the processor to:

control the actuator to perform a first number of valve cycles, wherein a valve cycle includes both actuating the valve element into the open position and actuating the valve element into the closed position;

record a first signal from the sensor following performance of the first number of valve cycles and forms a first measured value of a position of the valve element;

control the actuator to perform a second number of valve cycles;

record a second signal from the sensor following performance of the second number of valve cycles and forms a second measured value of a position of the valve element;

calculate a load characteristic value indicating a degree of load;

calculate a degree of wear based on the first measured value and the second measured value and the load characteristic value;

compare the degree of wear to a predefined threshold value;

transmit an output signal from the output device to the actuator if the degree of wear exceeds the predefined threshold value;

wherein the output signal comprises an interlock signal locking the actuator;

following recording the second signal, control the actuator to perform a third number of valve cycles;

record a third signal from the sensor following performance of the third number of valve cycles;

process the third signal to form a third measured value of a position of the valve element;

form a model based on at least the first and the second measured values and based on at least the first and the second number of valve cycles;

determine an expected value for the third measured value by applying the model to the third number of valve cycles;

determine a deviation of the third measured value from the expected value for the third measured value;

compare the determined deviation with a predefined maximum value for the determined deviation; and generate a predefined output signal using the output device if the determined deviation exceeds the predefined maximum value.

14. A control unit according to claim 13, wherein the output signal comprises an interlock signal locking the actuator until a manual intervention releases the actuator.

* * * * *